United States Patent [19]
Cain et al.

[11] Patent Number: 5,064,677
[45] Date of Patent: Nov. 12, 1991

[54] EDIBLE FAT-CONTAINING PRODUCT AND PROCESS FOR PREPARING SAME

[75] Inventors: Frederick W. Cain, Voorburg; Leendert H. Wesdorp, Schiedam, both of Netherlands

[73] Assignee: Van den Bergh Foods Co., Division of Conopco, Inc., Lisle, Ill.

[21] Appl. No.: 634,778

[22] Filed: Dec. 27, 1990

Related U.S. Application Data

[63] Continuation of Ser. No. 231,118, Aug. 11, 1988, abandoned.

[30] Foreign Application Priority Data

Aug. 19, 1987 [NL] Netherlands ........................ 8701952
Mar. 25, 1988 [GB] United Kingdom ................ 8807206

[51] Int. Cl.$^5$ ......................... A23D 9/00; A23D 9/02
[52] U.S. Cl. .................................. 426/611; 426/601; 426/602; 426/804
[58] Field of Search ............... 426/601, 602, 603, 804, 426/611, 607

[56] References Cited

U.S. PATENT DOCUMENTS

| 3,600,186 | 8/1971 | Mattson et al. | 426/611 |
| 4,005,195 | 1/1977 | Jandacek | 426/658 |
| 4,954,362 | 9/1990 | Wesdorp et al. | 426/602 |

FOREIGN PATENT DOCUMENTS 1327511  8/1973  United Kingdom .

Primary Examiner—Donald E. Czaja
Assistant Examiner—Drew S. Workman
Attorney, Agent, or Firm—Gerard J. McGowan, Jr.

[57] ABSTRACT

The present invention pertains to edible fat-containing products, in particular spreads, comprising at least 5% of hardstock indigestible polyol fatty acid polyesters, the fat-phase being characterized by an, at least, two-peaked DSC-curve. The invention further pertains to a process for the preparation of such products.

15 Claims, No Drawings

EDIBLE FAT-CONTAINING PRODUCT AND PROCESS FOR PREPARING SAME

This is a continuation, application of Ser. No. 07/231,118, filed Aug. 11, 1988 now abandoned.

BACKGROUND OF THE INVENTION

The invention relates to edible fat-containing products comprising indigestible polyol fatty acid polyesters. In particular, although not exclusively, the invention relates to such products of the emulsion type, such as margarines and low-fat spreads. The invention further relates to processes for the preparation of such products.

Polyol fatty acid polyesters, and in particular, the sugar fatty acid polyesters, such as e.g. the sucrose fatty acid polyesters, are known as suitable low-calorie fat-replacers in edible products. Substantially indigestible for human beings they have physical and organoleptic properties very similar to triglyceride oils and fats conventionally used in edible products. Polyol fatty acid polyesters are also reported to have use as pharmaceutical agents e.g. in view of their ability to take up fat-soluble substances, such as in particular cholesterol, in the gastro-intestinal tract, and subsequently remove those substances from the human body. Accordingly, it is attractive to replace at least part of the fat in edible fat-containing products by polyol fatty acid polyesters.

It is further reported that in food products the use of polyol fatty acid polyesters which are liquid at body temperature, may give rise to the so-called problem of anal leakage. Accordingly, it is particularly attractive to replace the more solid part (hardstock) of the fat by counter-part polyol fatty acid polyesters.

Edible fat-containing products comprising indigestible polyol fatty acid polyesters are known in the art, and described in eg U.S. Pat. Nos. 3,600,186, 4,005,195, 4,005,196, 4,034,083 and EP Pat. Publ. Nos. 0 233 856, 0 236 288, and 0 235 836.

In this specification, unless otherwise indicated, the term 'fat' refers to edible fatty substances in a general sense, including natural or synthesized fats and oils consisting essentially of triglycerides such as, for example, soybean oil, sunflower oil, palm oil, coconut oil, fish oil, lard and tallow, which may have been partially or completely hydrogenated or modified otherwise, as well as non-toxic fatty materials having properties similar to triglycerides, which materials may be indigestible, such as for example waxes, e.g. jojoba oil and hydrogenated jojoba oil, and polyol fatty acid polyesters referred to hereinafter in more detail. The terms fat and oil are used interchangeably.

In this specification the term 'polyol' is intended to refer to any aliphatic or aromatic compound which comprises at least four free hydroxyl groups. Such polyols in particular include the group of sugar polyols, which comprises the sugars, i.e. the mono-, di-and polysaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used sugar polyol is sucrose.

In this specification the term 'polyol fatty acid polyester' is intended to refer to any such polyesters or mixtures thereof of which, on an average, more than 70 % of the polyol hydroxyl groups have been esterified with fatty acids.

In this specification by 'indigestible' is meant that at least about 70 % by weight of the material concerned is not digested by the human body.

In this specification by 'hardstock' is meant that part of the fat composition characterized by a slip melting point of above 36° C. 'Slip melting point' is defined as the temperature at which the amount of solid phase in the melting fat has become so low that an air bubble is forced upwards in an open capillary filled with the fat.

Fat-containing products and in particular, emulsion-type products such as margarines and low-fat spreads, have to comply with requirements such as oral response, thermal stability, cycle stability, spreadability, melting behaviour and the like. Often they have to comply with such requirements simultaneously.

In particular, for margarines and low-fat spreads which contain relatively large amounts of polyunsaturated components, or require increased softness at lower (refrigerator) temperatures, it can be difficult to simultaneously comply with the requirements for cycle stability, thermal stability and acceptable taste properties.

Stability against temperature changes (cycle stability) is important in view of temperature changes during transport and storage as well as temperature changes which may frequently occur during household use. Improved storage temperature cycle stability is therefore advantageous, if not essential.

Heat stability, i.e. stability in terms of the absence of phase separation and of oil exudation, determines the ambient temperatures at which the product can be used. It will be clear that heat stability requirements are dependent of the climatic zone involved.

In general the heat stability is governed by the amount of hardstock, i.e. the amount of higher melting fats. A better heat stability, however, in general will result in a deterioration of the oral response, especially after temperature cycling. This is because the oral response largely depends on the melting behaviour of the fat phase.

Although not wishing to be bound by theory, it is believed that the difficult compatibility of heat stability, good oral response and cycling stability stems from the fact that good heat stability (e.g. heat stability at 30° C. for 24 hours) generally requires fat blend compositions containing relatively high amounts of higher melting fat fractions such as in particular fat fractions having melting points above mouth temperature. These higher melting fat fractions are believed to be responsible for the adverse effects on oral response and cycling stability.

Generally, in conventional fat-containing products the higher melting fat fractions crystallize in mixed crystals of non-equilibrium composition, which incorporate considerable amounts of the lower-melting fat fractions. In a well formulated blend the melting point of the mixed crystals is just below mouth temperature. Accordingly, in the mouth such blends will melt entirely, not giving rise to waxiness and, in the case of emulsions, fully releasing the salt and flavour compounds present in the water phase.

However, when conventional fat-containing products are subjected to temperature cycling, the mixed crystals demix, and a separate, purer fraction of the higher melting fats crystallizes. In this process a network of crystals is formed, which, if a dispersed water-phase is present, surrounds and stabilizes the dispersed water droplets in the form of shells. In the mouth the non- or only partially melting network of crystals introduces a waxy taste, and prevents release of salt or flavour compounds from the dispersed water droplets which remain stabilized.

Conventional products displaying good heat stability often combine this property with a rather bad cycling stability and oral response. Vice versa, conventional products having improved cycle stability, due to the presence of a relatively small amount of high melting fats often suffer from a poor heat stability.

SUMMARY OF THE INVENTION

It is now an object of the present invention to provide edible fat-containing products comprising indigestible polyol fatty acid polyesters as hardstock which products are characterised by an improved combination of properties, in particular with regard to thermal stability, oral response and storage temperature cycle stability.

It has been found that, if at least a significant part of the hardstock polyol fatty acid polyesters are processed such that crystallization takes place before full mixing with the remaining fat fraction, fat-containing products can be obtained meeting the above object. These products are characterised by multi-peaked differential scanning calorimetry (DSC) curves showing separate fat peaks at both sides of 36° C.

Accordingly, in a first aspect of the present invention there are provided fat-containing products comprising at least 5 %, calculated by weight of the total amount of fat, of hardstock indigestible polyol fatty acid polyesters, the product having a differential scanning calorimetry curve showing at least one fat peak above 36° C., and at least one fat peak below 36° C.

In a further aspect of the invention there is provided a process for the preparation of fat-containing products comprising at least 5%, calculated by weight of the total amount of fat, of hardstock indigestible polyol fatty acid polyesters, the process comprising the step of initially processing the product in two or more separate fat-containing fraction under such conditions that the fat in at least one of the fractions has partly or fully crystallized before the two or more fractions have been fully mixed.

DETAILED DESCRIPTION OF THE INVENTION

It has been found, that the fat-containing products, in particular the water-in-oil, oil-in-water and oil-in-water-in-oil emulsion types, prepared or preparable by the separate processing of fat fractions in accordance with the present invention, have greatly improved characteristics in terms of oral response, thermal stability and cycle stability.

It has further been found that the products in accordance with the invention can be formulated to have a reduced hardness at 5° C. and an equal or higher hardness at 20° C. compared to conventional fat-containing products based on the same components. This 'flatter' hardness-versus-temperature line is especially important for household spreads, where the cold spread, straight from the refrigerator, has to be spreadable, but on the other hand should not be too soft at room temperature.

An essential ingredient in the products according to the present invention are hardstock indigestible polyol fatty acid polyesters. The hardstock polyol fatty acid polyesters may be the only such polyesters present but they may also be part of a mixture of polyol fatty acid polyesters or a polyester blend, provided the overall polyol fatty acid polyester composition comprises a sufficient amount of hardstock polyol fatty acid polyesters.

In addition to the hardstock polyol fatty acid polyesters it is possible to further include conventional hardstocks triglyceride fats. However, it is preferred that the hardstock used in the products of the invention consists of over 50%, preferably of over 80% or even 90% by weight of polyol fatty acid polyesters. Most preferably the hardstock substantially completely consists of polyol fatty acid polyesters.

The total amount of hardstock in the products of the invention is at least 5% calculated by weight of the total amount of fat. Preferably the amount of hardstock lies in the range of 20 to 70%, the range of 30 to 50% being preferred most.

By variation of the particular blend of fatty acid residues used in the synthesis the melting point of the polyol fatty acid polyesters can be influenced. More saturated and/or long-chain fatty acid residues result in a higher melting point than unsaturated and/or short-chain fatty acid residues. The slip melting point of the hardstock polyol fatty acid polyesters preferably lies within the range of from 37° to 55° C., in particular of from 40° to 50° C.

Suitable polyol fatty acid polyesters have been defined in chemical terms hereinbefore. Preferably, polyol fatty acid polyesters derived from sugars or sugar alcohols are applied, and in particular, sugar fatty acid polyesters derived from disaccharides, such as sucrose. Very suitable have been found sugar fatty acid polyesters of which at least 50% of the fatty acid residues are derived from saturated fatty acids, in particular saturated $C_8$–$C_{22}$ fatty acid. Sucrose polyesters of which at least 70% of the fatty acid residues are derived from $C_{12}$–$C_{18}$ fatty acids, are preferred.

In general fatty acids per se or naturally occurring fats and oils may be used as source for the fatty acid residues in the polyol fatty acid polyesters. Conventional techniques may be used to introduce, if necessary, the required degree of saturation. Suitable such techniques include full or partial hydrogenation, interesterification, transesterification and fractionation, and may be used before or after conversion of the polyols to polyol fatty acid polyesters.

Suitably polyol fatty acid polyesters are used which are completely or partly derived from trans-hydrogenated triglycerides or the corresponding lower alkylesters thereof, as described in EP 0 235 836. Alternatively, the desired level of trans fatty acid residues may also be introduced by first converting to the polyol fatty acid polyester and subsequent trans-hydrogenation.

As defined hereinbefore polyol fatty acid polyesters may be applied of which, on an average, more than 70 % of the polyol hydroxyl groups have been esterified with fatty acids. Preferably polyol fatty acid polyesters are used with higher degrees of conversion, in particular polyol fatty acid polyesters of which, on an average, more than 85 % or even over 95 % of the polyol hydroxyl groups have been esterified with fatty acids.

The products in accordance with the invention in general have an overall fat content between 35 and 100 % by weight. In a preferred aspect of the invention such products are water-in-oil or oil-in-water-in-oil emulsions containing 35–90 % by weight of fat, margarine-type spreads having a fat content of 65–90 % by weight being preferred most. In an alternative aspect of the invention such products are margarine-like products containing over 95 %, in particular, about 98 % of fat, such as are used for baking purposes.

In addition to the hardstock fat the products of the invention generally comprise conventional oils and fats which may be of both animal and vegetable origin. Suitable conventional triglyceride fats and oils include, optionally partially hydrogenated, coconut oil, palmkernel oil, palm oil, marine oils, lard, tallow fat, butter fat, soybean oil, safflower oil, cotton seed oil, rapeseed oil, poppy seed oil, corn oil sunflower oil and mixtures thereof. Of these oils sunflower oil is preferred.

The non-hardstock part of the overall fat composition may also comprise indigestible oils, such as liquid polyol fatty acid polyesters. Suitably liquid polyol fatty acid polyesters, i.e. having slip melting points below 36° C., can be used to replace fully or partially the non-hardstock part of the fat composition. Also, instead of separate hardstock and non-hardstock polyol fatty acid polyester fractions, polyol fatty acid polyesters which comprise both hardstock and non-hardstock fractions may be advantageously used.

It may also be of advantage to obtain high-melting and low-melting fat fractions by fractionating a single fat blend, such as partially hardened soybean oil or a sugar polyester blend comprising both solid and liquid fractions, and use the high-melting and low-melting fractions separately.

It has been well recognised that fat-containing products containing relatively large amounts of digestible polyunsaturated fatty acid residues are attractive for their cholesterol-lowering effect. Such products are in particular those in which the fatty acid residues in the digestible part of the fat composition comprise a maximum of 35 % of saturated fatty acid residues. A useful characteristic to scale fat-containing products for their cholesterol-lowering effect is the ratio of polyunsaturated to saturated fatty acid residues (in this context only fatty acid residues in digestible fats are considered). The higher this ratio, the stronger the cholesterol-lowering effect. Since linoleic acid is the most important polyunsaturated fatty acid, instead of the above ratio in practice the ratio of linoleic acid to saturated fatty acid residues (LA/SFA ratio) can be used.

Products in which in particular the conventional saturated fat fraction (i.e. the conventional hardstock) is fully or partially replaced by indigestible polyol fatty acid polyesters having characteristics similar to the conventional hardstock fat fraction, allow an appreciable and desirable increment in the LA/SFA ratio. In the products according to the invention LA/SFA ratios are achieved of over 5, such as 6 to 8. If so desired, LA/SFA ratios can be achieved of over 10.

Fat-containing products, such as margarines, having a high amount of unsaturated components are of course characterized by the presence of large amounts of liquid oil, which leads to the problem that it is difficult to have sufficient thermal stability and hardness. The present invention allows products displaying an improvement in the hardness, without the necessity of a decrease in the amount of unsaturated components, and without a deterioration of the oral response. The amount of polyunsaturated fatty acid residues, such as in particular linoleic fatty acid residues, in the present fat product is preferably between 30 and 80 %, in particular at least 40 %, or even 50 or 60 % by weight of the total amount of digestible fatty acid residues present in the fat phase.

Since the considerations given hereinabove also apply for fat-containing products having lower fat contents, such as low-fat spreads with fat contents of between 35 and 65 % by weight the invention is equally directed to those.

Although the invention is especially directed to products of the water-in-oil and oil-water-in-oil emulsion type, such as margarines and spreads, the advantages are equally achieved in products of the oil-in-water emulsion type, such as mayonnaise, or non-emulsion type, such as shortenings, which incorporate significant amounts of hardstock.

In the products according to the invention conventionally used fat- and water-soluble additives, such as emulsifiers, milk, proteins, preservatives, vitamins, in particular, vitamins A, D and E, salt and flavour compounds, may be incorporated.

One of the aspects of the products according to the present invention is the presence of a fat peak in the DSC-curve above 36° C., i.e. a peak of which the top is located above 36° C. Preferably at least 80% of the surface area of the peak, i.e. the surface area between the base line and the line generated by the differential scanning calorimeter, is above 36° C. It is thus possible that part of the lower temperature tail of the peak is located below 36° C. When determining the surface area of individual peaks, in case peaks overlap, it is assumed that the peaks are symmetrical.

In this specification by 'peak in the DSC-curve' is meant an absolute or relative maximum in the DSC-curve. The term 'fat peak' is intended to exclude those peaks or parts of peaks which are not attributable to the fat part of the product.

At least one further fat peak should be present below 36° C. This may be a peak in the temperature range of 20° and 35° C., but also fat peaks at temperatures below this range correspond to DSC-curves in accordance with the present invention. Such fat peaks then correspond to lower crystallizing fat fractions. In the products according to the invention at least two separately melting fat fractions are present.

It is preferred that the DSC-curve surface area (as defined hereinbefore) below 36° C. is at least equal to the surface area above 36° C.

The DSC-temperature peaks of fat-containing products can be determined in the conventional way using a differential scanning calorimeter. A short survey of this method with some literature references is given in the Ullmanns Encyklopädie der technischen Chemie, 4. Auflage, Band 5, pages 793–795. In this application all DSC-curves are DSC-melting-curves.

The fat-containing products in accordance with the invention are characterised by at least 20 % by weight of the crystallized fat being present in the form of fat particles having sizes between 1 and 20 micrometres. Preferably at least 50 % by weight of the crystallized fat is present in the form of fat particles having sizes of more than 1 micrometre.

Most preferred are products wherein at least 40 % by weight of the crystallized fat is present in the form of fat particles having sizes ranging from 1–12 micrometres. In this context the term 'size' is intended to refer to the maximum diameter of the crystallized fat particles.

In general the fat product of the invention has an overall $N_{40}$ below 10, more preferably it has an $N_{35}$ below 10 and an $N_{20}$ below 30, preferably between 8 and 25. The N-values are measured by using the NMR method as described in Journal of American Oil Chemists' Society, 51 (1974), 316 by Van Putte et al.

The process for the preparation of the fat-containing products according to the present invention comprises as an essential step the initial split processing of the overall product in at least and preferably two separate fat-containing fractions which differ in the slip melting point of their fat fractions, such that at least partial crystallization takes place in, particularly, the fat fraction having the higher slip melting point before full mixing with the further fat-containing fractions has been effected.

In general a first separately processed fat-containing fraction is characterized by a fat phase having a slip melting point below 36° C., preferably below 35° C., or even 30° C. This fat phase may be substantially liquid before full mixing with the further fat-containing fractions, but it has been found of advantage when the fat in the first fraction contains some crystallized fat at the point of mixing, such as at least 1 % by weight, preferably between 2 and 20 % by weight of the fraction.

The fat phase in the second separately processed fat-containing fraction in general has a slip melting point above 36° C., preferably between 37° and 55°, and most preferably between 40° and 50° C. The fat phase in this fraction, which comprises the hardstock fats or at least a significant part thereof, such as at least 60 %, and preferably at least 80 % by weight, in general will contain crystallized fat at the point of mixing, although also crystal formation may take place during the mixing with further fat-containing fractions provided mixing conditions are such that partial crystallization has taken place before full mixing. Typical amounts of crystallized fat in this second fat-containing fraction before full mixing are between 2 and 30 % by weight, but preferably not more than 15 % by weight of the fraction.

It is preferred that the slip melting points of the fats in two separately processed fat-containing fractions differ by at least 5° C., more in particular 10° C. The magnitude of this difference influences the beneficial effects that may be derived from the process according to the present invention; the beneficial effect being more pronounced when the difference is larger.

The separately processed fat-containing fractions may comprise only fat components, but they may also be in the form of water-in-oil or oil-in-water emulsions, such as creams.

In a preferred aspect of the process of the invention, which is particularly directed to the preparation of spreads, a first fat or fat blend is emulsified with an aqueous phase. The temperature of the water-in-oil emulsion so obtained, if necessary, is adjusted to a value below 15° C., more in particular to below 10° C. More preferably, the temperature is adjusted to a value between 5° and 10° C. It is important to apply the correct temperature, as the second fat-containing fraction (discussed hereunder) has to crystallize due to the 'cold-content' of the emulsion, as preferably no further cooling steps are provided for. It is also important that the cold emulsion already has its final character, i.e. phase-inversion should have taken place already, and also the water droplet distribution should be near to its final status. The emulsion is preferably prepared by treatment in two A-units (scraped-surface heat exchangers) followed by a C-unit (pen stirrer), although it is possible to use other systems as well. The 'cold' water-in-oil emulsion, preferably containing at least 1 % by weight of crystallized fat, is thereafter mixed with a second fraction essentially consisting of a second fat or fat blend having a slip melting point above that of the first fat or fat blend which second fat or fat blend is at such a temperature that the solids content thereof is between 2 and 30 % by weight.

More preferably the emulsion of the first fat-containing fraction comprises from 2 to 20 % by weight of crystallized fat before mixing. The slip melting point of the first fat or fat blend is preferably below 35° C. More preferably, the slip melting point of the fat in the first fraction is below 30° C. and the slip melting point of the fat in the second fraction is above 40° C. In this case a very pronounced effect is noted, namely that a product is obtained combining a high thermal stability and with a very good stability against temperature cycling, presumably due to the presence of some kind of network of the second fat or fat blend. The presence of such a network, however, does not influence the taste of the fat spread negatively.

The emulsion of the first fat-containing fraction usually contains one or more emulsifiers that favour water-in-oil-emulsion, whereas also the fat- and water-soluble additives required for the final product are incorporated therein.

The second fat or fat blend comprises a partially molten fat, or a fat containing up to 30, preferably up to 25 % by weight of solids, more preferably not more than 10 % by weight solids (crystallized fat) at the temperature at which it is fed to the mixing unit for mixing with the cold emulsion, which temperature preferably is above 20.C. At the moment of mixing the second fat or fat blend with the water-in-oil emulsion, the second fat or fat blend may be in an supercooled state, as a consequence of which retarded crystallization may occur.

In the above preferred aspect of the process of the invention the hardstock polyol fatty acid polyesters and, optionally, the high melting triglycerides present in the second fat fraction, are mixed with the cold water-in-oil emulsion, comprising crystallized low melting triglycerides, as a result of which separately crystallized fat crystals will be present in the final product. Although we do not wish to be bound by theory, it is believed that this separate crystallization is responsible for the beneficial effects obtained by the present process.

By separately preparing the cold water-in-oil emulsion, an emulsion is obtained, wherein the surface of the water droplets is almost completely occupied with crystals of the low-melting fat fraction. On mixing this emulsion with the second fat fraction a final product is obtained in which the surface of the water droplets is still occupied with the low melting fat fraction. These products have a supreme oral response because the flavour release of the water droplets is not hindered by the presence of a shell of high melting fat crystals surrounding the water droplets. The separately crystallized high melting fat fraction, however, are present in the form a network, stabilizing the product, and preventing oil exudation at temperatures as high as 30° C.

The relative amounts of the two separate process streams can vary widely, depending on the type of fats and the amount of water present. A lower limit for the amount of water-in-oil-emulsion is 17.5 % by weight, corresponding to 82.5 % by weight of second fat fraction. The upper limit for the water-in-oil-emulsion is 97 % by weight, corresponding to 3 % by weight of second fat fraction. In general the contribution of the water-in-oil-emulsion will not exceed 90 % by weight.

In a further aspect of the invention an alternative preferred process comprises the step of preparing a first fraction essentially consisting of a fat or fat blend which includes part of the hardstock fats. This first fat or fat blend is thereafter mixed with a oil-in-water emulsion, such as in particular a cream, comprising the major part of the hardstock fats, preferably more than 60 % of the hardstock fats. The temperature and mixing profile may be essentially similar to the one described hereinbefore.

The conditions during the mixing of the two fractions of the spread can influence the product properties to a large degree. Short residence times and/or low shear favour the formation of a separate high melting crystal network. The shear rate should be low in order to prevent the substitution of low melting fat on the water droplet surface by high melting fat crystals, and also to avoid the breaking-up of the network of high melting fat crystals, which stabilizes the product.

Suitable mixers for this purpose are well-known. Examples thereof are static mixers and jet mixers. It is also possible to use a cavity transfer mixer, as described in WO-A 8 303 222.

After the mixing step, the product is fed to a packing line, without further working or cooling, and the spread is packed. The packed spread is then stored during which storage the final properties are obtained.

In the art it is reported that upon consumption of the fat-containing product the presence of polyol fatty acid polyesters may have a depletory effect on fat-soluble components, such as in particular, the fat-soluble vitamins A, D and E. The process in accordance with the invention allows a reduction of any such risk. In a preferred aspect of the invention any vitamins to be added are incorporated into a first separately processed fat-containing fraction which is substantially free from any indigestible polyol fatty acid polyesters. Accordingly, the hardstock polyol fatty acid polyesters are incorporated into the one or more further separately processed fractions, and at least partial crystallisation of the hardstock polyesters takes place before the vitamin-containing and polyester-containing fractions are mixed.

By application of the process of the present invention using said vitamin-containing and said hard-stock polyester-containing fractions any depletory effect on said vitamins has been reduced.

The invention is now further illustrated with reference to the following examples.

Example 1

A spread was prepared using a first and a second fraction having the following compositions (percentages being by weight of the final composition):

| first fraction (water-in oil emulsion) | |
|---|---|
| sunflower oil | 21.0% |
| sucrose fatty acid polyester (*) | 7.0% |
| NaCl | 0.2% |
| gelatin | 1.4% |
| sodium caseinate | 2.1% |
| emulsifiers | 0.3% |
| minors | 0.2% |
| water | 37.8% |
| (pH 5.1) | |
| second fraction (cream) | |
| sucrose fatty acid polyester (*) | 12.0% |
| NaCl | 0.1% |
| gelatin | 0.6% |

| -continued | |
|---|---|
| sodium caseinate | 0.9% |
| emulsifiers | 0.1% |
| minors | 0.1% |
| water | 16.2% |
| (pH 5.1) | |

(*) polyester fatty acid residues derived from 55% of fully hardened soybean oil and 45% of touch-hardened soybean oil; OH-number 10.2 corresponding to a degree of conversion of about 95%; slip melting point about 42° C.

The first fraction was initially prepared as a water-continuous premix which was processed using an A-unit (shaft speed 200 rpm; exit temperature 11.3° C.) and a subsequent C-unit (shaft speed 1460 rpm; exit temperature 26° C.) yielding a water-in-oil emulsion comprising about 4.5% of solids. Parallel thereto the second fraction was processed using a single A-unit (shaft speed 1000 rpm; exit temperature 39° C.) and subsequently injected into the stream of said first fraction immediately after the C-unit. The combined fractions were then further processed using an A-unit (shaft speed 500 rpm; exit temperature 13.3° C.) and a C-unit (shaft speed 1500 rpm; exit temperature 15° C.). After the C-unit the final product had a solids level of 13.4%.

For reasons of comparison a premix of the same overall product composition was also processed using the following sequence:

| unit type | shaft speed | exit temperature | % of solids at exit |
|---|---|---|---|
| A | 500 rpm | 37.8° C. | 0.0 |
| C | 1500 rpm | 31.0° C. | 2.6 |
| A | 500 rpm | 26.8° C. | 3.4 |
| C | 150 rpm | 28.0° C. | 6.2 |

From the hardness (1) and salt-release characteristics shown in Table 1 it is clear that the product processed in accordance with the present invention, although similar to the conventionally processed product (reference) in terms of salt release, is significantly softer at all evaluation temperatures.

(1) Hardness C-values and the measurement thereof are described in the Journal of American Oil Chemists' Society 36 (1959), 345.

TABLE 1

| | product processed according to invention | reference product |
|---|---|---|
| hardness | | |
| $C_5$ | 310 | 1200 |
| $C_{10}$ | 230 | 1070 |
| $C_{15}$ | 180 | 720 |
| $C_{20}$ | 145 | 435 |
| salt release | | |
| at 37° C. | 18.6 | 20.0 |
| 100% (°C.) | 40.1 | 41.4 |

Example 2

A spread was prepared using a first and a second fraction having the following compositions (percentages being by weight of the final composition):

| first fraction (water-in-oil emulsion) | |
|---|---|
| sunflower oil | 16.5% |
| partially hardened soybean oil | 44.0% |
| skim milk powder | 1.0% |
| NaCl | 1.7% |
| minors | 0.5% |
| water | 15.6% |

| second fraction (essentially hardstock fat) | |
|---|---|
| sucrose fatty acid polyester (similar to example 1) | 18.6% |
| sunflower oil | 2.1% |

The first fraction (slip melting point of fat phase 28° C.) was processed in a two subsequent A-units (scraped surface heat exchanger) and one C-unit (pen stirrer) yielding an emulsion at 8° C. comprising about 4% of solids. Parallel thereto the second fraction (slip melting point 45° C.) was processed in an A-unit followed by a C-unit yielding a fat phase at 42° C. comprising about 13$ of solids. Both fraction were fed to a cavity transfer mixer and filled into tubs to yield a product of about 9% of solids overall at 18° C.

The hardness characteristics of the product were as follows:

| $C_5$ | 400 |
|---|---|
| $C_{20}$ | 100 |
| $C_{25}$ | <100 |

Example 3

A spread was prepared using a first and a second fraction having the following compositions:

| first fraction (water-in-oil emulsion) | |
|---|---|
| sunflower oil | 48.5% |
| sucrose fatty acid polyester (similar to example 1) | 12.0% |
| skim milk powder | 1.0% |
| NaCl | 1.7% |
| minors | 0.5% |
| water | 15.6% |
| (slip melting point of fat phase 32° C.) | |
| second fraction (essentially hardstock fat) | |
| sucrose fatty acid polyester | 18.6% |
| sunflower oil | 2.1% |
| (slip melting point 45° C.) | |

The first fraction was processed in a two subsequent A-units and one C-unit yielding an emulsion of 8° C. comprising 9.5% of solids. Parallel thereto the second fraction was processed in an A-unit followed by a C-unit yielding a fat phase of 42° C. comprising about 11% of solids. Both fraction were fed to a cavity transfer mixer and filled into tubs to yield a product of about 15% of solids overall at 18° C.

The hardness characteristics of the product were as follows:

| $C_5$ | 800 |
|---|---|
| $C_{20}$ | 450 |
| $C_{25}$ | 300 |

Example 4

A spread was prepared using a first and a second fraction having the following compositions:

| first fraction (water-in-oil emulsion) | |
|---|---|
| sunflower oil | 42.2% |
| sucrose fatty acid polyester (similar to example 1) | 10.6% |
| skim milk powder | 1.0% |
| NaCl | 1.7% |
| minors | 0.5% |
| water | 15.6% |
| (slip melting point of fat phase 32° C.) | |
| second fraction (essentially hardstock fat) | |
| sucrose fatty acid polyester | 25.6% |
| sunflower oil | 2.8% |
| (slip melting point 45° C.) | |

The first fraction was processed in a two subsequent A-units and one C-unit yielding an emulsion of 8° C. comprising 9.4% of solids. Parallel thereto the second fraction was processed in an A-unit followed by a C-unit yielding a fat phase of 43° C. comprising about 6% of solids. Both fraction were fed to a cavity transfer mixer and filled into tubs to yield a product of about 15% of solids overall at 18° C.

The hardness characteristics of the product were as follows:

| $C_5$ | 700 |
|---|---|
| $C_{20}$ | 400 |
| $C_{25}$ | 200 |

Example 5

A spread was prepared using a first and a second fraction having the following compositions:

| first fraction (essentially fat) | |
|---|---|
| hardstock sucrose fatty acid polyester (*) | 11.2% |
| sunflower oil | 33.6% |
| minor ingredients | 0.2% |
| second fraction (cream plus added hardstock fats) | |
| hardstock sucrose fatty acid polyester | 22.0% |
| sodium caseinate | 3.0% |
| gelatine | 2.0% |
| salt | 1.8% |
| minor ingredients | 0.2% |
| water | 26.0% |

(*) polyester fatty acid residues derived from 57% of fully hardened palm kernel oil and 43% of fully hardened palm oil; OH-number 5.7 corresponding to a degree of conversion of about 97%; slip melting point about 40° C.

The first fraction was processed in an A-unit (500 rpm) yielding a fat phase of 10° C. comprising about 16% of solids. The second fraction was processed in an A-unit (1000 rpm) yielding a cream of 50° C. comprising only 2% of solids. Both fraction were fed to the same C-unit and mixed at 2500 rpm to give about 3% of solids overall at 35° C. Subsequently, the mixture was worked in an A-unit (1500 rpm) yielding the tub-fillable spread product of 17° C.

The hardness and salt release characteristics of the product were as follows:

| hardness | $C_5$ | 650 |
|---|---|---|
| | $C_{10}$ | 575 |
| | $C_{15}$ | 250 |
| | $C_{20}$ | 180 |
| salt release | at 33° C. | 16.3% |
| | at 37° C. | 99.7% |
| | at 37.3° C. | 100.0% |

What is claimed is:

1. Edible fat-containing product comprising at least 5 %, calculated by weight of the total amount of fat, of hardstock indigestible polyol fatty-acid polyesters, the product having a differential scanning calorimetry curve showing at least one fat peak above 36° C., and at least one fat peak below 36° C.

2. Product according to claim 1 which comprises 20 to 70 %, calculated by weight of the total amount of fat, of hardstock fats.

3. Product according to claim 1 which comprises a hardstock consisting of over 80 % by weight of hardstock indigestible polyol fatty acid polyesters.

4. Product according to claim 1 wherein said hardstock indigestible polyol fatty acid polyesters have a slip melting point of from 37° to 55° C.

5. Product according to claim 1 wherein at least 50 % by weight of the total amount of digestible fatty acid residues consists of polyunsaturated fatty acid residues.

6. Product according to claim 1 which is a water-in-oil emulsion or oil-in-water-in-oil emulsion containing 65 to 90 % by weight of fat.

7. Product according to claim 1 which is a water-in-oil emulsion or oil-in-water-in-oil emulsion containing 35 to 65 % by weight of fat.

8. A process for the preparation of edible fat-containing products comprising at least 5%, calculated by weight of the total amount of fat, of hardstock indigestible polyol fatty acid polyesters, the process comprising the step of initially processing said fat-containing product in two or more separate fat-containing fractions under such conditions that the fat in at least one of said fractions has partly or fully crystallized before said two or more fractions have been fully mixed, at least one of said fractions including an indigestible polyol fatty acid polyester.

9. Process according to claim 8 wherein the fat phase of a first separately processed fat-containing fraction has a slip melting point of below 35° C.

10. Process according to claim 8 wherein a first fat-containing fraction is separately processed such that it comprises 2 to 20 % by weight of crystallized fat before said full mixing.

11. Process according to claim 8 wherein the fat phase of a second separately processed fat-containing fraction has a slip melting point of between 40° and 50° C.

12. Process according to claim 8 wherein a second separately processed fat-containing fraction comprises at least 60 % by weight of the hardstock fats of the product.

13. Process according to claim 8 wherein a second fat-containing fraction is separately processed such that it comprises 2 to 30 % by weight of crystallized fat before said full mixing.

14. Process according to claim 8 wherein a first fat or fat blend is emulsified with an aqueous phase, the temperature of the resulting emulsion is adjusted to a value below 15° C., and subsequently said emulsion is mixed with a second fraction essentially consisting of a second fat or fat blend having a slip melting point above that of the first fat or fat blend.

15. Process according to claim 8 wherein fat-soluble vitamins are incorporated into a first separately processed fraction substantially free from any indigestible polyol fatty acid polyesters.

* * * * *